(No Model.)
G. A. BOBRICK.
AUTOMATIC HYDROMETER APPARATUS.
No. 302,539. Patented July 29, 1884.
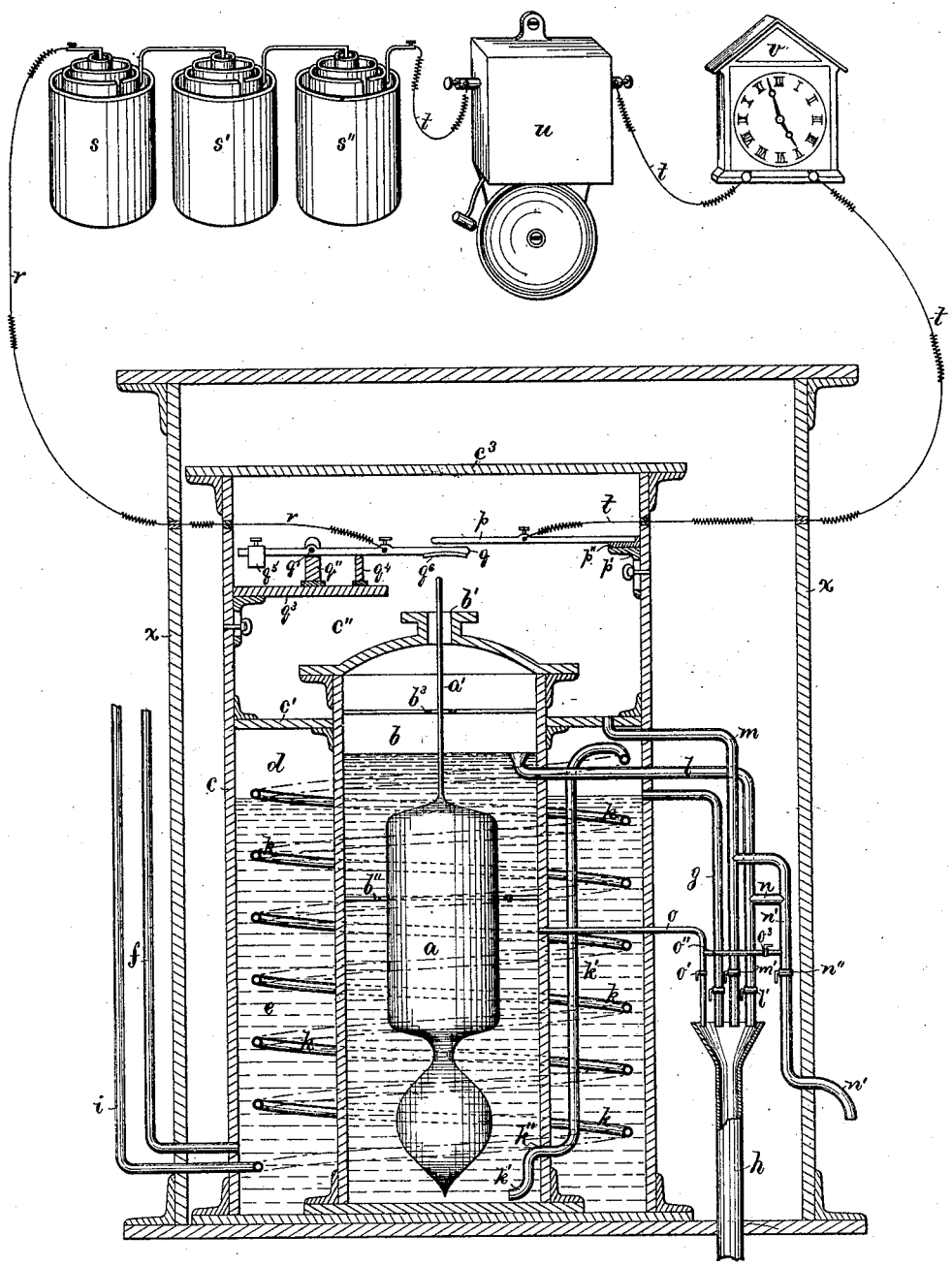
Witnesses
Henry Chadbourn.
John H. Foster.
Inventor
Gabriel A. Bobrick.
by Alban Andrén
his atty.

UNITED STATES PATENT OFFICE.

GABRIEL A. BOBRICK, OF BOSTON, ASSIGNOR, BY MESNE ASSIGNMENTS, TO HIMSELF, AND FREDERICK N. WALES, OF NEWTON, MASS.

AUTOMATIC HYDROMETER APPARATUS.

SPECIFICATION forming part of Letters Patent No. 302,539, dated July 29, 1884.

Application filed June 21, 1883. (No model.)

*To all whom it may concern:*

Be it known that I, GABRIEL A. BOBRICK, a citizen of Russia, now residing at Boston, in the county of Suffolk and State of Massachusetts, have invented certain new and useful Improvements in Automatic Hydrometer Apparatus; and I do hereby declare that the same are fully described in the following specification and illustrated in the accompanying drawing.

This invention relates to improvements in automatic hydrometer apparatus for the purpose of self-registering the specific gravity of any desired liquid while in process of being made, compounded, distilled, refined, or manufactured in any other manner applicable to liquids—such as, for instance, beer, alcohols, sugar, or liquids of any kind. With this object in view, I employ a suitable hydrometer of the ordinary kind, which is located in a receptacle that contains the liquid, which is made to circulate in such receptacle, and when the liquid attains the desired specific gravity the upper stem of the hydrometer comes in contact with one of the electrodes in an electric circuit, causing the electric current to be closed and an electric bell-alarm or other alarm to be sounded, by which notice is given to persons in charge that the liquid has attained the desired specific gravity, and is then ready to be drawn off or further acted upon, as the case may be. In the electrical circuit I also locate a suitable electric clock or time-piece or other equivalent time-register, which is wound up and kept going as long as the circuit is broken, but is automatically stopped the moment that the circuit is closed, so as to indicate at what time the liquid attained its desired specific gravity, and how long time it remained in such condition before the operator in charge attended to its subsequent manufacture.

In measuring and indicating the specific gravity of liquids it is necessary that it should be done at a normal temperature of such liquid, and for this purpose I surround the hydrometer-vessel with an annular receptacle containing water in circulation, in which a coiled pipe is kept, and through such pipe the liquid is made to pass from the vat or boiler used in its manufacture to the hydrometer-receptacle, which is provided with an overflow-pipe, through which the liquid passes off after it reaches a normal level in said hydrometer-receptacle, and such liquid may be made to run off into a sewer or be forced back again to the desired vat or boiler from which it was drawn.

In the drawing is represented a vertical section of the apparatus, in which—

$a$ represents a suitable hydrometer of the ordinary kind, having upwardly-projecting stem $a'$, as shown. Said hydrometer is located in the liquid that is to be tested, such liquid being contained and kept in circulation in the cylinder $b$, closed at its lower end, and provided in its upper end with an open neck, $b'$, through which the stem $a'$ of the hydrometer can play freely up and down.

$b''$ and $b^3$ are suitable guides surrounding the hydrometer $a$ and its neck $a'$ loosely, so as to keep the said hydrometer in a central position within the cylinder $b$, with freedom to move up and down according to the density of the liquid contained in the said cylinder $b$.

$c$ is a closed cylinder surrounding the inner cylinder, $b$, between which and the former is an annular chamber, $d$, which contains the water $e$, which is kept in circulation in said chamber $d$ by means of inlet-pipe $f$ and overflow-pipe $g$, emptying into the sewer-pipe $h$ or other pipe or gutter, as may be desired. The liquid to be tested is forced in from a suitable vat or boiler through the pipe $i$ and up through the coiled pipe $k$, which is submerged in the cooling liquid or water $e$, so as to lower the temperature of the liquid to be tested to zero or any other desired normal temperature before it is introduced into the testing-cylinder $b$.

$k'$ is a pipe leading from the upper end of coil $k$, descending downward, and made to enter the lower part of cylinder $b$ at $k''$, as shown.

$c'$ is a closed cover at the top of the annular cooling-chamber $c$, above which is arranged the closed chamber $c''$ with its cover $c^3$, as shown.

$l$ is an overflow-pipe leading from the upper end of cylinder $b$ to the sewer-pipe $h$, and it is provided in its lower end with a valve or cut-off $l'$, as shown. $m$ is an overflow-pipe leading from the bottom of chamber $c''$ to the sewer-pipe $h$, and it is also provided with a suitable valve or cut-off, $m'$, in its lower end, as shown, to enable any liquid that may get into chamber $c''$ from the upper end of cylinder $b$ to be automatically withdrawn therefrom. The overflow-pipes $l$ and $m$ are united by means of a branch-pipe, $n$, located above the valves $l'\,m'$, and communicating with the delivery-pipe $n'$, which is provided with a suitable valve or cut-off, $n''$, as shown, so that the testing-liquid escaping from the chambers $b$ and $c''$ may be returned to the place originally drawn from by closing the valves $l'\,m'$ and opening the valve $n''$ and connecting the end of pipe $n'$ to the boiler, tank, or vat in which the liquid is in process of being manufactured. The liquid may be thus returned by means of a suitable pump or other device, as may be desired. Thus the liquid that is being tested may be allowed to pass off through the sewer-pipe $h$ or returned to its source, according to the nature of the liquid and the wish of the manufacturer.

$o$ is a small pipe leading from the inner cylinder, $b$, to the sewer-pipe $h$, and is provided with a valve or cut-off, $o'$, and said pipe serves to draw off the liquid from cylinder $b$, after the desired specific gravity is obtained. Above the valve $o'$ on the pipe $o$ a pipe, $o''$, leads from the latter to the delivery-pipe $n'$, so as to conduct the liquid passing out through pipe $o$ back again to the vat or boiler from which it was originally drawn.

$o^3$ is a valve or cut-off on the pipe $o''$, which is closed, and the valve $o'$ opened, when the liquid from chamber $b$ is allowed to pass into sewer-pipe $h$, if so desired.

In the upper part of the chamber $c''$ is arranged the stationary electrode $p$, secured to the vertically-adjustable bracket $p'$, and insulated from it by means of a suitable non-conductor, $p''$, as shown.

$q$ is a movable electrode-lever, hinged at $q'$ to the bearing $q''$, which is insulated from and secured to the vertically-adjustable arm or bracket $q^3$.

$q^4$ is an insulated stop projection on the upper side of bracket $q^3$, and $q^5$ is an adjustable balance-weight on the rear end of the electrode-lever $q$, by means of which said lever $q$ may be balanced to such a nicety as to cause its forward end to touch the forward end of lever $p$ as soon as the upper end of hydrometer-stem $a'$ comes in contact with the insulated piece $q^6$ on the under side of the lever $q$, by which said levers $p$ and $q$ are brought in metallic contact and electrical connection.

$r$ is a wire leading from lever $q$ to one pole of a battery, $s\,s'\,s''$, and $t$ is a wire leading from the lever $p$ to the other pole in the circuit.

$u$ is a suitable electric alarm, and $v$ is a suitable time-registering apparatus or clock located in the electrical circuit, so that when the circuit is closed by the contact of levers $p$ and $q$, caused by the rise of the hydrometer $a$, an alarm is sounded and the time mechanism $v$ is stopped, and remains in such a condition until the liquid in process of manufacture is withdrawn from the cylinder $b$, indicating that the desired specific gravity is reached.

$x$ is a case of wood or metal, for the purpose of inclosing the hydrometer apparatus and preventing its being tampered with by the operators. With a slight modification the invention may to equal advantage be used to indicate any desired lowering of the specific gravity of the liquid in process of being manufactured.

An additional alarm and time register or indicator may be placed in the circuit in connection with other well-known registering devices, and located in the office of the manufactory or in the residence of the manager or proprietor, to give automatic notice to such persons or others when the specific gravity desired is reached, and give other desired information as to the attention and doings of the workmen or operators in charge of the process.

What I wish to secure by Letters Patent and claim is—

1. In a hydrometer apparatus, the electrode $p$, fixed at one end, the electrode $q$, hinged at $q^2$, and provided with the weight $q^5$, and rest $q^4$, in combination with the wires of a battery, an alarm and time-piece, and a hydrometer, as set forth, the ends of the electrodes and the stem of the hydrometer being in line, as set forth.

2. In a self-registering electrical hydrometer apparatus, the hydrometer $a\,a'$, testing-receptacle $b$, annular cooler $d$, coiled feed-pipe $k$, overflow-pipes $l\,m\,n\,n'$, with their respective valves or cut-offs $l'\,m'\,n''$, and inclosing-box $x$, all arranged and combined as and for the purpose set forth.

In testimony whereof I have affixed my signature in presence of two witnesses.

GABRIEL A. BOBRICK.

Witnesses:
ALBAN ANDRÉN,
HENRY CHADBOURN.